United States Patent Office 3,416,911
Patented Dec. 17, 1968

3,416,911
METHOD OF DEFOLIATING AND DESICCATING PLANTS WITH SUBSTITUTED TRIPHENYL PHOSPHATES AND PHOSPHITES
Jack Hensel, Fairway, Kans., nad Delta W. Gier, Parkville, Mo., assignors to Chemagro Corporation, New York, N.Y., a corporation of New York
No Drawing. Filed Dec. 9, 1965, Ser. No. 512,778
19 Claims. (Cl. 71—71)

ABSTRACT OF THE DISCLOSURE

Triphenyl phosphites and phosphates of the general formulas

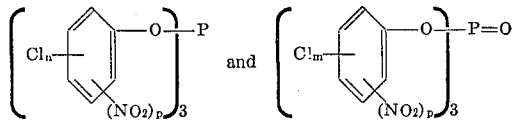

wherein $n$ is an integer from 0 to 3, $m$ is an integer from 1 to 3 and $p$ is an integer from 1 to 2 and processes of defoliating and desiccating plants employing these organophosphorus compounds.

This invention relates to desiccants and defoliants.

Pentachlorophenol is a known cotton desiccant but it does not have government approval. Due to its strongly acidic nature it is quite corrosive in nature.

It is an object of the present invention to prepare novel chloronitro phenyl phosphates.

Another object is to develop a novel process for desiccating and/or defoliating plants, e.g. cotton.

An additional object is to develop cotton defoliants with low toxicities and a low order of corrosiveness.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Some of the advantages of defoliating plants such as cotton are set forth in Regel Patent No. 3,193,372 on col. 2, lines 35–56.

According to the present invention there are used as defoliants and desiccants for cotton and other plants certain phosphites and phosphates.

The phosphites have the formula

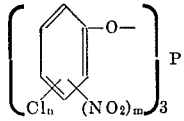

where $n$ is an integer of 0 to 3 when $m$ is 1 or 2 and $n$ is 3 when $m$ is 0 and $m$ is an integer from 0 to 3. Preferably, the compounds have at least one nitro group as well as at least one chloro group. The preferred phosphites are tris (trichloromononitrophenyl) phosphites, most preferably tris (2,4,5-trichloro-6-nitrophenyl) phosphite. The next most preferred compound is tris (2-chloro-4-nitrophenyl) phosphite.

The phosphates which can be used according to the invention have the formula

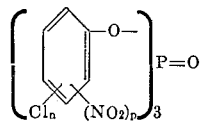

where $n$ is an integer of 0 to 3 and $p$ is an integer of 1 to 2.

In general the phosphites are preferred to the corresponding phosphates.

The phosphites and phosphates employed as defoliants and desiccants in the present invention are economical to prepare, noncorrosive and relatively non-toxic.

They are much more economical to prepare, for example, than the corresponding monothiophosphates wherein the thio atom is doubly bonded to the phosphorus atom. In addition, the phosphites and phosphates in general are superior defoliants and desiccants to the corresponding monothiophosphates.

Many of the phosphites employed in the present invention are novel compounds and some of the phosphates are also novel compounds.

Examples of compounds which can be used as defoliants and desiccants according to the invention are tris (2,4,5-trichlorophenyl) phosphite, tris (2,4-dichloro-6-nitrophenyl) phosphite, tris (2,4,5-trichloro-6-nitrophenyl) phosphite, tris (2-chloro-4-nitrophenyl) phosphite, tris (2,6-dichloro-4-nitrophenyl) phosphite, tris (2-nitro-4-chlorophenyl) phosphite, tris (3-chloro-4-nitrophenyl) phosphite, tris (2,6-dinitro-4-chlorophenyl) phosphite, tris (4-nitrophenyl) phosphite, bis (2,4,5-trichloro-6-nitrophenyl) phosphite, 2,6-dichloro-4-nitrophenyl phosphite, tris (2,4,6-trichloro-3-nitrophenyl) phosphite, tris (2,4-dichloro-6-nitrophenyl) phosphate, tris (2,4,5-trichloro-6-nitrophenyl) phosphate, tris (2-chloro-4-nitrophenyl) phosphate, tris (2,6-dichloro-4-nitrophenyl) phosphate, tris (2-nitro-4-chlorophenyl) phosphate, tris (3-chloro-4-nitrophenyl) phosphate, tris (2,6-dinitro-4-chlorophenyl) phosphate, tris (4-nitrophenyl) phosphate.

The compounds employed as defoliants and desiccants in the present invention are prepared by reacting one mole of phosphorus trichloride (in preparing the phosphites) or one mole of phosphorus oxychloride (in preparing the phosphates) with 3 moles of the appropriate substituted phenol, e.g. 2,4,5-trichlorophenol, 2,4-dichloro-6-nitrophenol, 2,4,5-trichloro - 6 - nitrophenol, 2-chloro-4-nitrophenol, 2,6-dichloro-4-nitrophenol, 2-nitro-4-chlorophenol, 3-chloro - 4 - nitrophenol, 2,6-dinitro-4-chlorophenol, 4 - nitrophenol, 2,4,6 - trichloro - 3 - nitrophenol.

The compositions employed in the present invention comprise the active defoliant or desiccant described herein together with materials referred to in the art as adjuvants, diluents, carriers and the like. The thus diluted active ingredient is hereby rendered adaptable for application by means of jets, nozzles, spreaders, dusters, foggers and similar devices used in the practice of the art. Typical adjuvants, carriers and diluents are represented by water, heavy mineral oil, heptane, benzene, kerosene, xylene, carbon tetrachloride, talc, pyrophyllite, and diatomaceous earth. With water as the diluent it is conventional to add wetting agents to effect good foliage coverage. Among suitable wetting agents are Triton X–100 (an alkyl aryl polyester alcohol made by condensing 1 mole of p-octylphenol with 10 moles of ethylene oxide), Triton X–171 (blend of octylphenol-polyethylene glycol adduct having about 16 ethylene oxide units admixed with higher alkyl sulfates having 10–18 carbon atoms in the alkyl group), Triton X–161 (blend of octylphenyl-polyethylene glycol adduct having between 10 and 20 ethylene oxide units admixed with higher alkyl sulfates having 10–18 carbon atoms in the alkyl group) Tween 20 (polyoxyalkylene derivative of sorbitan monolaurate), glycerol sorbitan laurate, sodium dodecylbenzene sulfonate, sodium stearate, potassium oleate, sodium lauryl sulfate, sodium dodecane sulfonate, sodium lignin sulfonate, tert. dodecyl polyethylene glycol thioether, long chain ethylene oxide-propylene oxide condensation product.

The emulsifying or wetting agents are generally employed in only very small concentrations, for example, in a quantity up to about 0.3% by weight based on the phorus trichloride (in making the phosphites) or 0.05 mole of phosphorus oxychloride (in making the phosphates) was added cautiously with stirring. Then 0.155 mole (a slight excess) of triethylamine in 50 ml. of anhydrous ether was added dropwise to the reaction mixture with vigorous stirring and intermittent ice cooling. Following addition of the triethylamine, the mixture was heated to ether reflux temperature for four hours.

The slurry was cooled, filtered and washed with ether. Some of the products were ether soluble, while others were insoluble in ether. For the ether soluble products, the ether filtrate was washed twice with water and dried. The solvent was removed on a spin evaporator at room temperature, and the product again dried under vacuum.

For the ether insoluble products, the residue was transferred to a beaker, washed well with cold water and filtered. The wet product was dried in a vacuum desiccator.

Examples of tris substituted phenyl phosphites having the formula $(RO)_3P$ prepared according to the above described reaction are given in Table 1 while examples of the corresponding phosphates having the formula $(RO)_3P=O$ are given in Table 2.

TABLE 1

| R (in $(RO)_3P$) | Ether solubility | Percent yield | Physical condition | M.P., °C. | Percent Cl | Percent P |
|---|---|---|---|---|---|---|
| 2,4-dichlorophenyl | Soluble | 90 | White powder | 78–80 | 4.10 | 5.8 |
| 2,4,5-trichlorophenyl | do | 65 | do | 114–116 | 52.2 | 4.7 |
| 2,4-dichloro-6-nitrophenyl | do | 98 | Tan solid | 101–103 | 33.2 | 4.4 |
| 2,4,5-trichloro-6-nitrophenyl | do | 94 | Yellow wax | 78–80 | 41.9 | 4.1 |
| 2-chloro-4-nitrophenyl | do | 97 | Tan powder | 117–118 | 19.7 | 5.5 |
| 2,6-dichloro-4-nitrophenyl | Insoluble | 70 | do | 113–115 | 33.3 | 4.6 |
| 2-nitro-4-chlorophenyl | Soluble | 73 | Yellow crystal | 92–94 | 18.4 | 5.4 |
| 3-chloro-4-nitrophenyl | Insoluble | 82 | White powder | 119–120 | 19.4 | 5.6 |
| 2,6-dinitro-4-chlorophenyl | do | 90 | Orange solid | 73–76 | 15.3 | 4.4 |
| 4-nitrophenyl | do | 90 | White powder | 110–112 |  | 6.9 |

TABLE 2

| R (in $(RO)_3P=O$) | Ether solubility | Percent yield | Physical condition | M.P., °C. | Percent Cl | Percent P |
|---|---|---|---|---|---|---|
| 2,4-dichlorophenyl | Soluble | 86 | White powder | 100–101 | 40.1 | 5.8 |
| 2,4,5-trichlorophenyl | Insoluble | 90 | do | 170–172 | 51.1 | 4.9 |
| 2,4-dichloro-6-nitrophenyl | do | 90 | do | 99–100 | 32.5 | 4.3 |
| 2,4,5-trichloro-6-nitrophenyl | Soluble | 80 | Red oil | 68–70 | 41.4 | 4.0 |
| 2-chloro-4-nitrophenyl | do | 86 | Tan powder | 132–133 | 18.6 | 5.4 |
| 2,6-dichloro-4-nitrophenyl | Insoluble | 100 | White powder | 212–213 | 31.0 | 4.3 |
| 2-nitro-4-chlorophenyl | Soluble | 53 | Yellow crystal | 93–95 | 18.9 | 5.6 |
| 3-chloro-4-nitrophenyl | Insoluble | 81 | White powder | 142–143 | 18.4 | 5.6 |
| 2,6-dinitro-4-chlorophenyl | do | 98 | Tan solid | 70–80 | 15.8 | 4.2 |
| 4-nitrophenyl | do | 94 | White powder | 158–160 |  | 6.7 | weight of the emulsion. However, higher concentrations may be used, as high as 5% by weight, provided that it does not exert an adverse effect on the plant preventing defoliation by causing phytotoxicity. When the active ingredient is formulated in oils such formulations can be applied directly to the plant to be defoliated with or without the addition of wetting agents.

The defoliants of the present invention are effective when applied in the range between 0.25 and 10 pounds per acre. The concentration of the active ingredient in the formulations can be varied over wide ranges depending upon the diluents and the mode of application. Suspensions containing as little as 0.1% by weight can be effectively employed as well as concentrations as high as 5%.

Unless otherwise indicated all parts and percentages are by weight.

EXAMPLE 1

The phosphites and phosphates were all prepared in the following manner. There was employed a 500 ml. three-necked flask equipped with a mechanical stirrer, a reflux condenser, and an addition funnel. The flask was charged with 0.15 mole of the appropriate substituted phenol and 150 ml. of anhydrous ether. Exactly 0.05 mole of phos-

EXAMPLE 2

The compounds set forth in Tables 1 and 2 were all tested as cotton defoliants and desiccants in the following formulation. A mixture was made of 1 pound of the phosphite or phosphate being tested in a gallon of Formula A. Formula A was a mixture of 2 parts of a premix and 1 part of dimethylformamide. The premix was composed of 8 parts of xylene (Velsicol AR–50), 1 part of Triton X–161 and 1 part of butyl carbitol acetate.

The compounds in the above formulations were then applied to mature cotton at the indicated rates per acre of ingredient to be tested (the phosphite or phosphate). The percentage of defoliation was measured after 4 days as was the percentage of desiccation. The defoliation was recorded at both 8 and 2 lbs./acre of ingredient tested while the desiccation was recorded as a combined average amount of desiccation for the two rates by adding the amount of desiccation at 8 lbs./acre to the amount of desiccation at 2 lbs./acre and dividing by two.

The results obtained with tris substituted phenyl phosphites having the formula $(RO)_3P$ are given in Table 3 and the results with the corresponding phosphates having the formula $(RO)_3P=O$ are given in Table 4.

TABLE 3

| R (in (RO)₃P) | Rate, lbs. AI/acre | Percent defoliation | Percent desiccation |
|---|---|---|---|
| 2,4-dichlorophenyl | 8<br>2 | 0<br>0 | 0 |
| 2,4,5-trichlorophenyl | 8<br>2 | 0<br>0 | 45 |
| 2,4-dichloro-6-nitrophenyl | 8<br>2 | 0<br>0 | 35 |
| 2,4,5-trichloro-6-nitrophenyl | 8<br>2 | 35<br>20 | 65 |
| 2-chloro-4-nitrophenyl | 8<br>2 | 52<br>0 | 75 |
| 2,6-dichloro-4-nitrophenyl | 8<br>2 | 68<br>42 | 60 |
| 2-nitro-4-chlorophenyl | 8<br>2 | 19<br>12 | 25 |
| 3-chloro-4-nitrophenyl | 8<br>2 | 48<br>13 | 50 |
| 2,6-dinitro-4-chlorophenyl | 8<br>2 | 21<br>22 | 30 |
| 4-nitrophenyl | 8<br>2 | 54<br>12 | 45 |

TABLE 4

| R (in (RO)₃P=O) | Rate, lbs. AI/acre | Percent defoliation | Percent desiccation |
|---|---|---|---|
| 2,4-dichlorophenyl | 8<br>2 | 0<br>0 | 0 |
| 2,4,5-trichlorophenyl | 8<br>2 | 0<br>0 | 0 |
| 2,4-dichloro-6-nitrophenyl | 8<br>2 | 0<br>0 | 30 |
| 2,4,5-trichloro-6-nitrophenyl | 8<br>2 | 10<br>19 | 75 |
| 2-chloro-4-nitrophenyl | 8<br>2 | 36<br>12 | 40 |
| 2,6-dichloro-4-nitrophenyl | 8<br>2 | 36<br>22 | 35 |
| 2-nitro-4-chlorophenyl | 8<br>2 | 7<br>7 | 15 |
| 3-chloro-4-nitrophenyl | 8<br>2 | 8<br>3 | 10 |
| 2,6-dinitro-4-chlorophenyl | 8<br>2 | 38<br>34 | 40 |
| 4-nitrophenyl | 8<br>2 | 3<br>6 | 0 |

From Tables 3 and 4 it will be observed that in general the phosphites were superior to the phosphates in combined defoliation and desiccation properties. It will also be observed that both tris (2,4-dichlorophenyl) phosphite and tris (2,4-dichlorophenyl) phosphate were ineffective as either defoliants or as desiccants. Tris (2,4,5-trichlorophenyl) phosphate was ineffective as either a defoliant or as a desiccant but the corresponding tris (2,4,5-trichlorophenyl) phosphite was a moderately good desiccant although ineffective as a defoliant.

Tris (4-nitrophenyl) phosphite was a good defoliant and disiccant while the corresponding tris (4-nitrophenyl) phosphate was a poor defoliant and ineffective as a disiccant.

The best compounds in overall defoliation and desiccant properties were tris (2,4,5-trichloro-6-nitrophenyl) phosphite and tris (2,6-dichloro-4-nitrophenyl) phosphite while the two compounds showing the best desiccant properties were tris (2,4,5-trichloro-6-nitrophenyl) phosphate and tris (2-chloro-4-nitrophenyl) phosphite.

EXAMPLE 3

In another experiment tris (2,4,5-trichloro-6-nitrophenyl) phosphite in actual field tests in four geographical locations gave 95% desiccation of mature cotton plants at 4.0, 3.0, 2.0 and 1.5 pounds of active ingredient per acre.

We claim:

1. The method of defoliating and desiccating plants which comprises contacting the plant in an amount effective for such purpose, with a compound having a formula selected from the group consisting of (a)

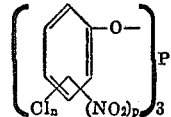

and (b)

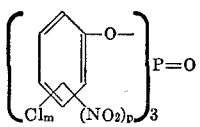

where $n$ is an integer from 0 to 3, $m$ is an integer from 1 to 3, and $p$ is an integer from 1 to 2.

2. A method according to claim 1 wherein the plants are cotton plants.

3. A method according to claim 1 wherein said compound has Formula (a).

4. A method according to claim 3 wherein said compound is tris (trichloronitrophenyl) phosphite.

5. A method according to claim 4 wherein said compound is tris (2,4,5-trichloro-6-nitrophenyl) phosphite and the plants are cotton plants.

6. A method according to claim 3 wherein said compound is tris (dichloronitrophenyl) phosphite.

7. A method according to claim 6 wherein said compound is tris (2,6-dichloro-4-nitrophenyl) phosphite and the plants are cotton plants.

8. A method according to claim 3 wherein said compound is tris (dinitrochlorophenyl) phosphite.

9. A method according to claim 3 wherein said compound is tris (chloronitrophenyl) phosphite.

10. A method according to claim 9 wherein said compound is tris (2-chloro-4-nitrophenyl) phosphite and the plants are cotton plants.

11. A method according to claim 9 wherein said compound is tris (3-chloro-4-nitrophenyl) phosphite and the plants are cotton plants.

12. A method according to claim 3 wherein said compound is tris (nitrophenyl) phosphite.

13. A method according to claim 1 wherein said compound has Formula (b).

14. A method according to claim 13 wherein the plants are cotton plants.

15. A method according to claim 13 wherein said compound is tris (trichloronitrophenyl) phosphate.

16. A method according to claim 15 wherein said compound is tris (2,4,5-trichloro-6-nitrophenyl) phosphate and the plants are cotton plants.

17. A method according to claim 13 wherein said compound is tris (dinitrochlorophenyl) phosphate.

18. A method according to claim 13 wherein said compound is tris (dichloronitrophenyl) phosphate.

19. A method according to claim 13 wherein said compound is tris (2-chloro-4-nitrophenyl) phosphate and the plants are cotton plants.

References Cited

UNITED STATES PATENTS

| 2,599,827 | 6/1952 | Hansberry | 71—70 |
| 2,861,876 | 11/1958 | Birum | 71—71 |
| 2,979,391 | 4/1961 | Markley | 71—71 |
| 2,985,688 | 5/1961 | Mersch et al. | 260—622 |
| 3,037,043 | 5/1962 | Goyette | 260—461 |
| 2,850,537 | 9/1958 | Stoesser | |
| 2,910,402 | 10/1959 | Fairchild. | |

FOREIGN PATENTS 666,372   7/1963   Canada.

OTHER REFERENCES

Brun et al., cited in Chem. Abst. 57, 10280 (1962).
Korolev et al., cited in Chem. Abst. 55, 9766 (1961).
Melnikov et al., cited in Chem. Abst. 48, 9903 (1954).

LEWIS GOTTS, *Primary Examiner.*

M. KASSENOFF, *Assistant Examiner.*

U.S. Cl. X.R.

71—86; 260—954, 967.